United States Patent
Bott et al.

(10) Patent No.: US 8,063,517 B2
(45) Date of Patent: Nov. 22, 2011

(54) COMBINATION DRIVE WITH A HYBRID RELUCTANCE MOTOR

(75) Inventors: Erich Bott, Hollstadt (DE); Matthias Braun, Weichtungen (DE); Detlef Potoradi, Bad Neustadt/Saale (DE); Holger Schunk, Lendershausen (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 294 days.

(21) Appl. No.: 11/912,596

(22) PCT Filed: Apr. 21, 2006

(86) PCT No.: PCT/EP2006/061729
§ 371 (c)(1),
(2), (4) Date: Jun. 10, 2008

(87) PCT Pub. No.: WO2006/114390
PCT Pub. Date: Nov. 2, 2006

(65) Prior Publication Data
US 2009/0212644 A1  Aug. 27, 2009

(30) Foreign Application Priority Data
Apr. 25, 2005 (DE) .......................... 10 2005 019 112

(51) Int. Cl.
*H02K 41/03* (2006.01)
*H02K 21/44* (2006.01)
*H02K 41/02* (2006.01)

(52) U.S. Cl. ................. 310/12.14; 310/154.02; 310/181
(58) Field of Classification Search ............... 310/12.14, 310/154.02, 154.08, 154.28, 154.29, 162, 310/166, 181; *H02K 41/02, 41/03, 21/12, 21/38, 21/44*
See application file for complete search history.

(56) References Cited

U.S. PATENT DOCUMENTS

| | | | | |
|---|---|---|---|---|
| 3,999,090 A | * | 12/1976 | Sinnott | 310/154.28 |
| 4,563,602 A | * | 1/1986 | Nagasaka | 310/12.22 |
| 4,607,197 A | * | 8/1986 | Conrad | 310/12.14 |
| 4,933,585 A | * | 6/1990 | Rossi | 310/162 |

(Continued)

FOREIGN PATENT DOCUMENTS
DE     102 61 796 A1    7/2004
(Continued)

OTHER PUBLICATIONS

VDI-Bericht 1269: Innovative Kleinantriebe "Stand der Technik und Entwicklungstendenzen konventioneller Antriebe" von H.-D. Stölting, May 1996, pp. 3 to 10.

*Primary Examiner* — Quyen Leung
*Assistant Examiner* — Michael Andrews
(74) *Attorney, Agent, or Firm* — Henry M. Feiereisen; Ursula B. Day

(57) ABSTRACT

The aim of the invention is to create a combined linear-rotary drive that has a compact, simple, and inexpensive design. Said aim is achieved by a combined drive comprising a linear driving device (3) and a rotary driving device (11), at least one of the two driving devices being provided with a hybrid reluctance motor. It is particularly advantageous to embody both driving devices as hybrid reluctance motors such that the rotor (4) can be produced at a low cost without permanent magnets in addition to ensuring that the drive has a very compact design.

10 Claims, 3 Drawing Sheets

U.S. PATENT DOCUMENTS

| | | | |
|---|---|---|---|
| 5,093,596 A | 3/1992 | Hammer | |
| 5,315,751 A * | 5/1994 | Hammer | 29/598 |
| 6,087,742 A * | 7/2000 | Maestre | 310/12.24 |
| 6,376,957 B1 * | 4/2002 | Haydock et al. | 310/154.02 |
| 6,483,221 B1 * | 11/2002 | Pawellek et al. | |
| 6,628,031 B2 * | 9/2003 | Vollmer | |
| 6,768,238 B2 * | 7/2004 | Knauff et al. | |
| 6,812,612 B2 * | 11/2004 | Schunk et al. | |
| 6,858,965 B2 * | 2/2005 | Müller et al. | |
| 6,875,945 B2 * | 4/2005 | Knauff et al. | |
| 6,885,187 B2 * | 4/2005 | Duenisch et al. | |
| 6,943,467 B2 * | 9/2005 | Potoradi et al. | |
| 6,943,611 B2 * | 9/2005 | Braun et al. | |
| 7,112,902 B2 * | 9/2006 | Schunk et al. | |
| 7,141,905 B2 * | 11/2006 | Vollmer | |
| 7,229,205 B2 * | 6/2007 | Schunk et al. | |
| 7,285,883 B2 * | 10/2007 | Bott et al. | |
| 7,352,099 B2 * | 4/2008 | Schunk et al. | |
| 7,501,728 B2 * | 3/2009 | Knauff et al. | |
| 7,564,158 B2 * | 7/2009 | Huth et al. | |
| 2003/0011267 A1 * | 1/2003 | Vollmer | |
| 2003/0052563 A1 * | 3/2003 | Assmann et al. | |
| 2003/0094940 A1 * | 5/2003 | Duenisch et al. | |
| 2003/0160028 A1 * | 8/2003 | Knauff et al. | |
| 2003/0173853 A1 * | 9/2003 | Knauff et al. | |
| 2003/0179021 A1 * | 9/2003 | Braun et al. | |
| 2003/0179035 A1 * | 9/2003 | Braun et al. | |
| 2004/0075359 A1 * | 4/2004 | Müller et al. | |
| 2004/0084989 A1 * | 5/2004 | Schunk et al. | |
| 2004/0155539 A1 * | 8/2004 | Potoradi et al. | |
| 2004/0188127 A1 * | 9/2004 | Braun et al. | |
| 2004/0223403 A1 * | 11/2004 | Schunk et al. | |
| 2004/0261553 A1 * | 12/2004 | Bott et al. | |
| 2005/0012413 A1 * | 1/2005 | Bott et al. | |
| 2005/0082940 A1 * | 4/2005 | Knauff et al. | |
| 2005/0099086 A1 * | 5/2005 | Schunk et al. | |
| 2005/0163641 A1 * | 7/2005 | Schunk et al. | |
| 2005/0231060 A1 * | 10/2005 | Vollmer | |
| 2006/0049697 A1 * | 3/2006 | Binnard | 310/12 |
| 2006/0219880 A1 * | 10/2006 | Braun et al. | |
| 2007/0035193 A1 * | 2/2007 | Huth et al. | |
| 2007/0040466 A1 * | 2/2007 | Vollmer | |
| 2007/0114861 A1 * | 5/2007 | Bott et al. | |

FOREIGN PATENT DOCUMENTS

| | | |
|---|---|---|
| DE | 10 2004 045 992 A1 | 6/2006 |
| EP | 0 655 825 A1 | 5/1995 |
| JP | 52046413 A | 4/1977 |
| JP | 4128074 U | 4/1992 |
| JP | 4229063 B2 | 8/1992 |
| JP | 2006174552 | 6/2006 |

* cited by examiner

COMBINATION DRIVE WITH A HYBRID RELUCTANCE MOTOR

BACKGROUND OF THE INVENTION

The present invention relates to a combination drive having a linear drive device and a rotation drive device.

Until now, combined linear and rotation drives, also referred to as combination drives, have been mostly formed from two separate units. One of the units carries out the linear movement, while the other of the units carries out the rotation. The units are often also physically separated from one another. However, for the purposes of more recent developments, the two units have also been integrated in one housing.

FIG. 5 shows one such known combination drive in the form of a cross section. This combination drive is used, for example, for driving ink rollers in a printing mechanism. A linear motor 1, in the form of an external rotor, and a conventional rotating motor 2 are used in the drive. Both the linear motor and the rotating motor are in the form of synchronous motors with permanent-magnet excitation. The entire drive has two separate stators of different design, and two separate rotors of different design. However, the rotors are arranged on a common shaft.

One major disadvantage of the combination drive shown in FIG. 5 is that the entire rotor can move backwards and forwards only through a specific distance. This linear movement is fixed by the design for respective application. The drive can therefore be used only for that specific application. It is therefore not possible without changes to increase the linear movement without redesigning the motor. A further disadvantage is that the rotor cannot be removed from the motor in any desired manner for installation purposes.

A further disadvantage that has been found with the combination drive described above is that the two parts of the rotor must be designed differently. For this reason, the two stators must be arranged at an appropriate distance apart, thus predetermining a certain motor length which is too large for certain applications, or results in problems.

So-called hybrid reluctance motors are known in principle in the field of drives. In this case, the forces or torques of the motors are produced both by means of variable reluctance and by means of permanent magnets. This is mentioned, for example, in the VDI Reports 1269 dated May 1996.

Furthermore, German patent application DE 10 2004 045992.4 discloses a synchronous linear motor with a secondary part without any permanent magnets. The windings are incorporated in the primary part, adjacent to which the permanent magnets are also arranged.

SUMMARY OF THE INVENTION

The object of the present invention is to propose a compact, simple and low-cost design for a combined linear and rotation drive.

According to the invention, this object is achieved by a combination drive having a linear drive device and a rotation drive device, with at least one of the two drive devices having a hybrid reluctance motor.

The motor principle of the hybrid motor, in which two active magnetic mechanisms are combined with one another, can therefore advantageously be used for a combination drive. This allows the combination drive to be designed to be simple and to cost little.

Both the linear drive device and the rotation drive device preferably each have a hybrid reluctance motor. This allows a single motor principle to be used for the entire drive.

According to one particularly preferred refinement, the rotor is designed without any permanent magnets. This allows rotors with a long physical length to be produced at relatively low cost.

The rotor of the combination drive according to the invention can be designed such that it is used at the same time as a rotor for the linear drive device and as a rotor for the rotation drive device, and in the process is structured uniformly over its entire axial extent. This results in advantages relating to disassembly of the drive, and with respect to the production costs for the rotor.

Furthermore, the rotor may have a reluctance profile with slots which are distributed uniformly both in the circumferential direction and in the axial direction. A rotor designed in this way can be produced with very little effort.

According to a further advantageous refinement, the rotor is formed integrally from steel. This also has a positive effect on the production costs, especially in comparison to laminated rotors.

Specifically fields of application for the combination drive according to the invention exist in the field of machine tools, injection-molding machines and printing machines. In this case, in particular, drill spindles, extruder worms and ink rollers can be equipped with the combination drive as described above. In addition, robots, automatic placement machines, automatic packaging machines for the food industry and the like can be provided with combination drives.

BRIEF DESCRIPTION OF THE DRAWING

The present invention will now be explained in more detail with reference to the attached drawings, in which.

DETAILED DESCRIPTION OF PREFERRED EMBODIMENTS

The exemplary embodiment which is described in more detail in the following text represents one preferred embodiment of the present invention.

Figure 1:
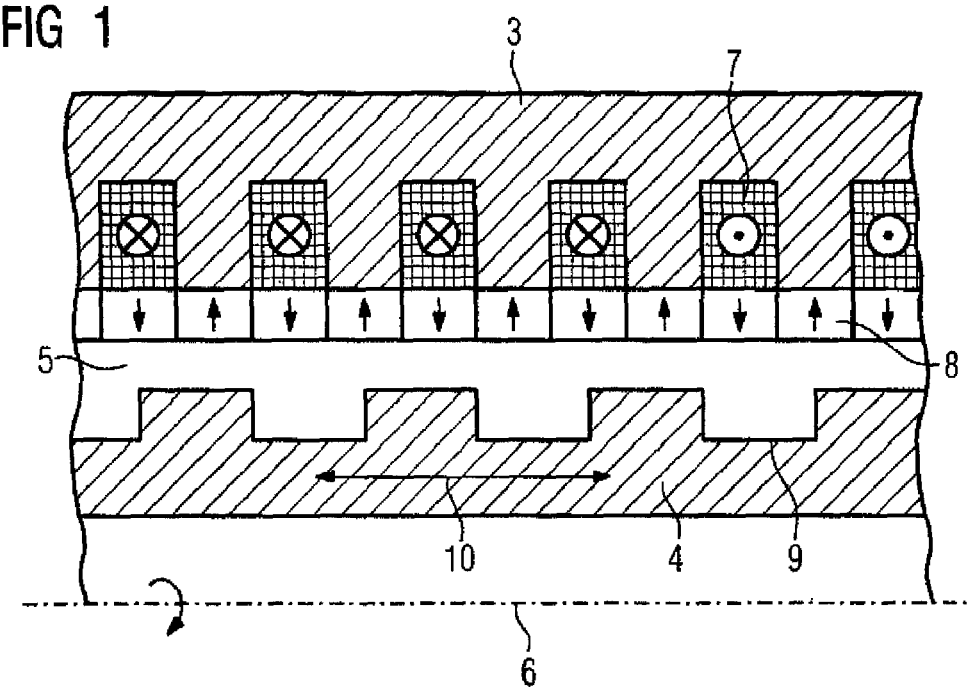
FIG. 1 shows a cross-sectional detail of a linear drive part of a combination drive according to the invention.
Figure 2:
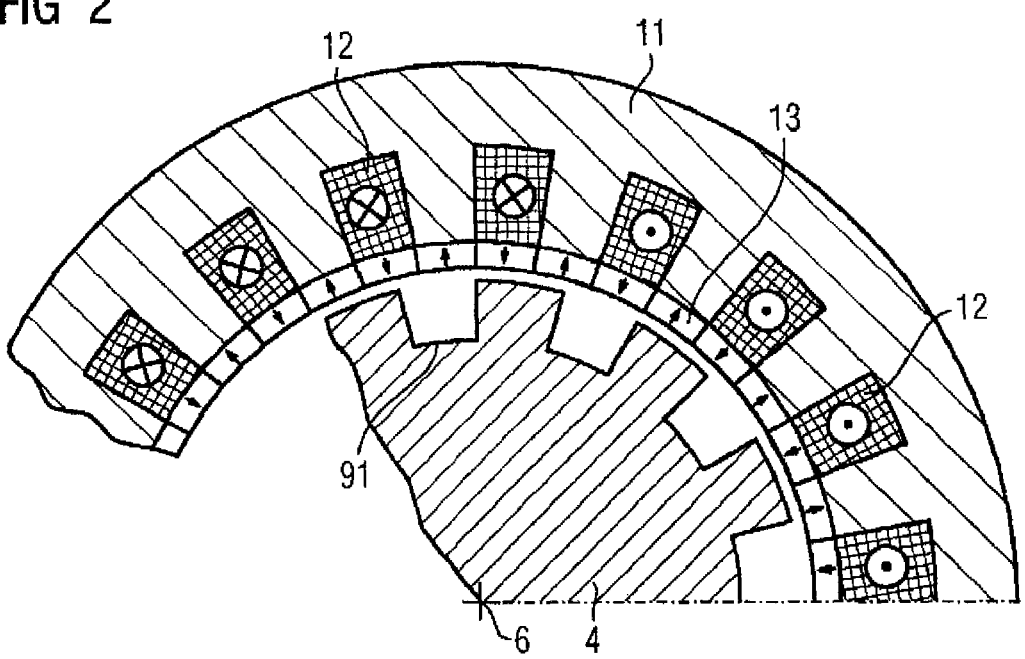
FIG. 2 shows a cross-sectional part of a rotation part of a combination drive according to the invention.
Figure 3:
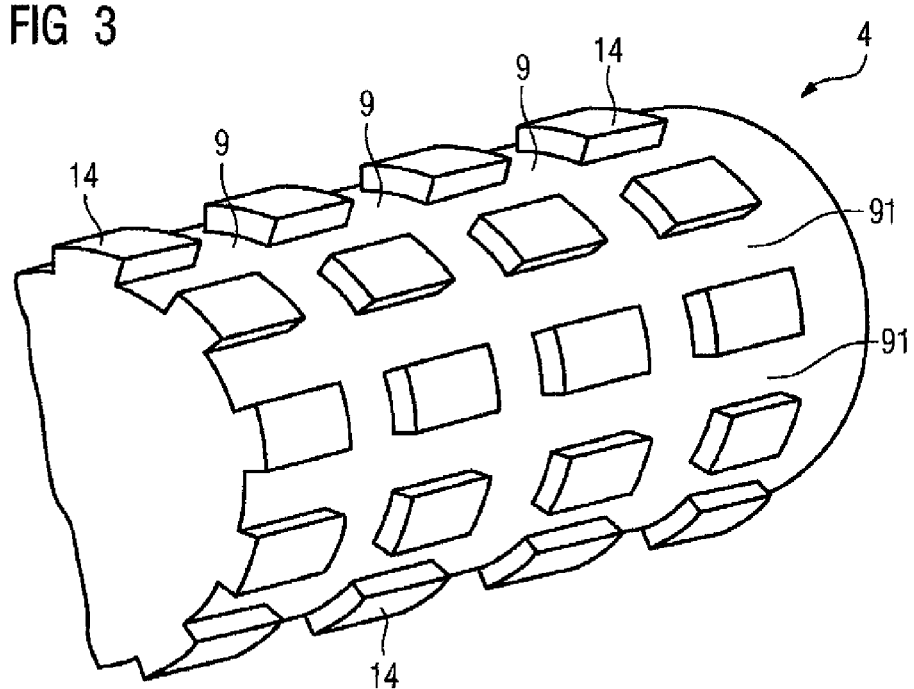
FIG. 3 shows a three-dimensional view of a rotor according to the invention.

FIGS. 1 to 3 show details of a combination drive in which both the linear drive and the rotation drive are formed by a hybrid reluctance motor. In the chosen embodiment, the rotor, or the secondary part, has no permanent magnets.

The detail of the linear drive illustrated in the form of a longitudinal section in FIG. 1 has a cylindrical stator 3 in which a likewise cylindrical rotor 4 is arranged, with an air gap 5 between them. The stator 5 and the rotor 4 are rotationally symmetrical with respect to the rotation axis 6. Windings 7 are inserted in slots in the stator 3. FIG. 1 indicates a current flow direction through the windings 7. Permanent magnets 8 are arranged on the inside of the stator 3. Their magnetization is symbolized by arrows in FIG. 1.

The rotor 4 has slots 9 whose widths are matched to the width of the permanent magnets 8 and of the windings 7. The principle of operation of this linear motor is disclosed in German patent application DE 10 2004 045 992.4, as cited above. The rotor 4 can be moved in the axial direction, as indicated by the double-headed arrow 10, within the stator 3. In conjunction with the field fundamental of the stator 3 and the reluctance profile of the rotor 4, the permanent magnets 8 develop an axial force.

FIG. 2 shows a part of the rotation drive device of the combination drive, in the form of a section at right angles to its rotation axis 6. The rotor 4 is in this case surrounded by the stator 11 of the rotation drive. Slots 91 in the rotor 4 can clearly be seen.

A three-phase winding 12 is incorporated in slots in the stator 11. Permanent magnets 13 with the appropriate magnetization are in turn arranged adjacent to the inner surface of the cylindrical stator 11. The width (in the circumferential direction) of the slots 9 in the rotor 3 is matched to the width of the permanent magnets 13 and of the winding 12. In conjunction with the field fundamental of the stator 11 and the reluctance profile of the rotor 4, the permanent magnets develop a torque. By way of example, for a machine with one pair of stator poles, 24 pairs of permanent poles and 23 rotor teeth, the rotation speed of the rotor will be ⅟₂₃ of the stator rotation frequency.

The electromagnetic configuration of the linear drive shown in FIG. 1 corresponds to that of the rotation drive shown in FIG. 2, since the principle of the hybrid reluctance motor with a rotor or secondary part without any permanent magnets is chosen in both cases.

FIG. 3 shows the structure of the rotor 4. On its surface, it has slots 9 in the circumferential direction and slots 91 in the axial direction. This results in rectangular raised areas 14, which reduce the reluctance of the stator or primary part. The rotor 4 is composed exclusively of steel, of sintered material, or is laminated. Since it has no permanent magnets or windings, its only effect is reluctance.

Figure 4:
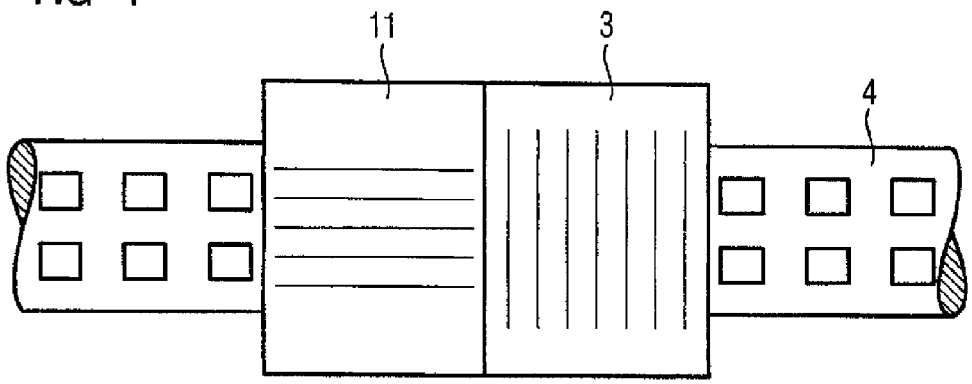
FIG. 4 shows a side view of a combination drive according to the invention.
Figure 5:
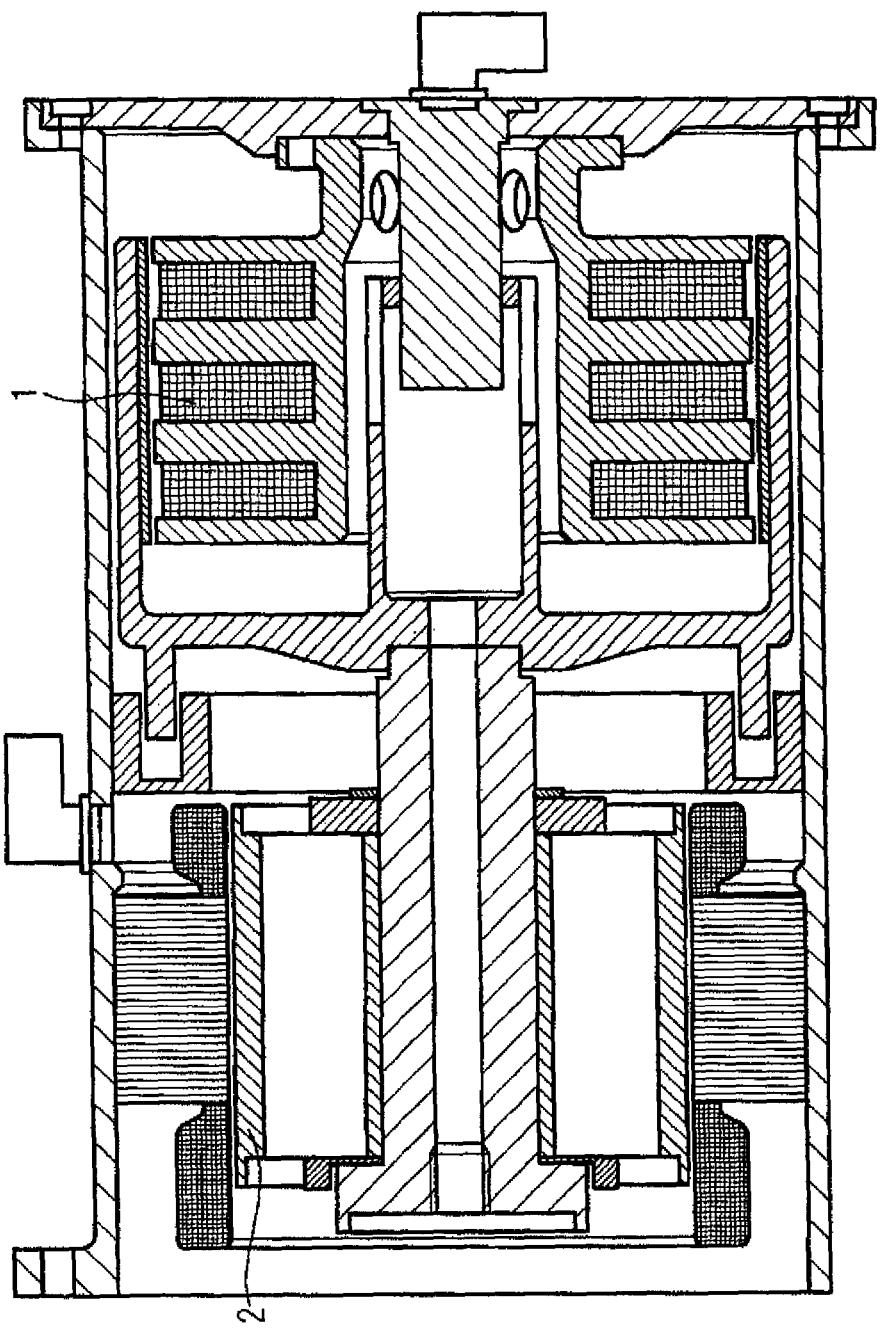
FIG. 5 shows a cross section through a combination drive according to the prior art.

FIG. 4 shows a side view of the overall combination drive. The stators 3 and 11 of the linear drive and the rotation drive are arranged axially directly adjacent to one another. They drive the common rotor 4, which has the same structure over its entire length. This means that the linear drive and the rotation drive can jointly use the rotor at virtually all axial positions. In contrast to this, the rotation drive which is known from the prior art as shown in FIG. 5 cannot use the rotor section of the linear drive, and vice versa.

As can easily be seen from FIG. 4, the rotor 4 can be pushed through the motor without any problems, thus resulting in advantages for assembly and for operation. A further advantage of this rotor 4 is that it can be produced easily. The rotor contour can be produced from a solid steel shaft by longitudinal milling and incision turning, at very low cost. Furthermore, this rotor design makes it possible to use the entire length of the rotor 4 to form force and torque. If the rotor as shown in FIG. 5 were to be composed of rotor sections of different design, then the arrangement would be disproportionately much longer for long linear movements. On the basis of the principle shown in FIG. 4, the two stators 3, 11 can be assembled very closely even for long linear movements, thus making it possible to ensure that the drive is physically compact. The invaluable advantage that there is no need to arrange expensive permanent magnets on the rotor has already been mentioned in the introduction, and is particularly worthwhile for long linear movements.

What is claimed is:

1. A combination drive, comprising:
   a linear drive device having a hybrid reluctance motor including a stator with a plurality of teeth and slots between neighboring teeth, and permanent magnets arranged on an inside of the stator and covering both the teeth and the gaps between the teeth and having alternating direction of magnetization; and
   a rotation drive device having a hybrid reluctance motor including a stator with a plurality of teeth and slots between neighboring teeth, and permanent magnets arranged on an inside of the stator and covering both the teeth and the gaps between the teeth and having alternating direction of magnetization,
   wherein the linear drive device and the rotation drive device have a common rotor in the absence of a permanent magnet,
   wherein the common rotor includes a plurality of elevations in axial spaced-apart relationship and in circumferential spaced-apart relationship which are separated by common slots.

2. The combination drive of claim 1, wherein the permanent magnets of the linear drive point alternately in an axial direction from the stator to the rotor, and vice versa, and wherein the permanent magnets of the rotation drive device point alternately in a circumferential direction from the stator to the rotor, and vice versa.

3. The combination drive of claim 1, wherein the rotor is a part common to the linear drive device and the rotor of the rotation drive device and is constructed uniformly over its entire axial extent.

4. The combination drive of claim 1, wherein the rotor has a reluctance profile with slots which are distributed uniformly both in a circumferential direction and in an axial direction.

5. The combination drive of claim 1, wherein the rotor is made in one piece from steel.

6. The combination drive of claim 1, for use in a machine tool, an injection-molding machine, a printing machine or a robot.

7. The combination drive of claim 1, wherein the elevations are formed on an outside of the rotor and spaced from one another in axial and circumferential spaced-apart in a uniform manner.

8. The combination drive of claim 1, wherein the elevations have a rectangular configuration.

9. The combination drive of claim 1, wherein the stator of the linear drive has windings wound in a circumferential direction in slots of the stator of the linear drive, and the stator of the rotation drive has windings wound in axial direction in slots of the stator of the rotation drive.

10. The combination drive of claim 1, wherein the stator of the linear drive and the stator of the rotation drive have teeth and slots for receiving the permanent magnets, each tooth defined by a first width and each slot defined by a second width which is equal to the first width.

* * * * *